Patented May 8, 1928.

1,669,379

UNITED STATES PATENT OFFICE.

CARL F. PESTER, OF ROSELLE PARK, NEW JERSEY, ASSIGNOR TO STANDARD OIL DEVELOPMENT COMPANY, A CORPORATION OF DELAWARE.

TREATING EMULSIONS.

No Drawing.   Application filed March 20, 1923.   Serial No. 626,371.

This invention relates to the art of treating emulsions of hydrocarbon oils and water for the purpose of breaking such emulsion and will be fully understood from the following description.

In proceeding in accordance with this invention, sludge from hydrocarbon oils refined by fuming or concentrated sulfuric acid is added without neutralization by an alkali of any acid present or formed by the treatment to the emulsion and the mixture may be heated, (for example to 100°–212° F.), or not as desired. The proportion of sludge used is in general from ¼ to 5% or more, varying somewhat in accordance with the particular emulsion concerned, more resistant emulsions requiring higher proportions of the agent; also where heat is not applied, more of the sludge is generally required.

As an illustrative example of the process: To a separator slop emulsion there is added 1% of an unneutralized sludge from refining lubricating stock with fuming sulfuric acid, the sludge being thinned down with about 75% of water for instance, and the mixture is heated in suitable apparatus, for example a wooden or lead-lined tank, to a temperature of about 170° F. Upon standing, the emulsion separates into oil and water layers.

While I have referred more particularly to a common refinery emulsion by way of example, it will be understood that the process is also applicable to field emulsions.

I have used the term "strong sulfuric acid" as generic to all concentrations of sulfuric acid, including fuming acid, which will produce hydrocarbon sulfonic acids suitable for the purpose herein defined.

What I claim is:
 1. The improvement in the art of treating emulsions of hydrocarbon oils and water, which comprises adding to the emulsion one-fourth to five percent of an unneutralized sludge obtained from refining hydrocarbon lubricating oils with strong sulfuric acid, and heating the mixture to about 170° F.
 2. The improvement in the art of treating emulsions of hydrocarbon oils and water, which comprises adding to the emulsion about one-fourth to five percent of an unneutralized sludge from refining hydrocarbon lubricating oils with strong sulfuric acid, and heating the mixture.
 3. The improvement in the art of treating emulsions of hydrocarbon oils and water, which comprises adding to the emulsion about one-fourth to five percent of an unneutralized sludge from refining hydrocarbon lubricating oils with strong sulfuric acid.
 4. The improvement in the art of treating emulsions of hydrocarbon oils and water, which comprises subjecting the emulsion to the action of an unneutralized sludge obtained from refining hydrocarbon lubricating oils with strong sulfuric acid.
 5. The improvement in the art of treating emulsions of hydrocarbon oils and water, which comprises subjecting the emulsion to the action of a sulfonic-acid-containing sludge obtained from refining hydrocarbon oils with strong sulfuric acid.
 6. Method according to claim 5, in which a sludge obtained by fuming acid treatment of hydrocarbon oil is used.

CARL F. PESTER.